(12) United States Patent  
Martinchek

(10) Patent No.: US 10,297,802 B2  
(45) Date of Patent: May 21, 2019

(54) FUEL CELL STACK SEALING METHODS, APPARATUS, AND SYSTEMS

(71) Applicant: GM GLOBAL TECHNOLOGY OPERATIONS LLC, Detroit, MI (US)

(72) Inventor: David A. Martinchek, Spencerport, NY (US)

(73) Assignee: GM Global Technology Operations LLC., Detroit, MI (US)

( * ) Notice: Subject to any disclaimer, the term of this patent is extended or adjusted under 35 U.S.C. 154(b) by 1134 days.

(21) Appl. No.: 14/018,678

(22) Filed: Sep. 5, 2013

(65) Prior Publication Data

US 2015/0064598 A1    Mar. 5, 2015

(51) Int. Cl.
| | |
|---|---|
| H01M 8/24 | (2016.01) |
| H01M 2/10 | (2006.01) |
| B21C 23/02 | (2006.01) |
| H01M 8/0206 | (2016.01) |
| H01M 8/0223 | (2016.01) |
| H01M 8/0273 | (2016.01) |
| B21C 23/14 | (2006.01) |

(52) U.S. Cl.
CPC ......... *H01M 2/1077* (2013.01); *B21C 23/142* (2013.01); *H01M 8/0206* (2013.01); *H01M 8/0223* (2013.01); *H01M 8/0273* (2013.01); *H01M 2250/20* (2013.01); *Y02T 90/32* (2013.01); *Y10T 29/49826* (2015.01)

(58) Field of Classification Search
CPC . H01M 8/0276; H01M 8/0286; H01M 8/0273
See application file for complete search history.

(56) References Cited

U.S. PATENT DOCUMENTS

| | | | | | |
|---|---|---|---|---|---|
| 4,125,280 | A | * | 11/1978 | Kuzel | F16L 39/00 165/148 |
| 4,356,271 | A | * | 10/1982 | Francis | C04B 28/06 264/43 |
| 4,371,433 | A | * | 2/1983 | Balko | C25B 9/206 204/230.2 |

(Continued)

FOREIGN PATENT DOCUMENTS

| | | |
|---|---|---|
| CN | 1846324 | 10/2006 |
| CN | 101438447 | 5/2009 |

OTHER PUBLICATIONS

Can Kreuz: "PEM—Brennstoffzellen mit spritzgegossenen Bipolarplatten aus hochgefOlltem Graphit-Compound", Dissertation, Fakultat fOr Ingenieurwissenschaften, Abteilung Maschinenbau der Universitat DuisburgEssen, 2008.

(Continued)

*Primary Examiner* — Sadie White  
(74) *Attorney, Agent, or Firm* — Quinn IP Law

(57) ABSTRACT

Methods, apparatus, and systems for improving and/or simplifying one or more seals in a fuel cell stack, such as a vehicle fuel cell stack. In some implementations, a plate or assembly for the stack may be extruded through an extrusion die so as to create a plate comprising a top surface, a bottom surface, and a plurality of cavities disposed between the top and bottom surfaces. At least a subset of the cavities may be filled with a cavity-filler material distinct from a material used to form the plate, such as a foam material. One or more headers, such as grommet seals, may then be overmolded into the plate to form corresponding conduits between the top surface and the bottom surface of the plate/assembly.

19 Claims, 6 Drawing Sheets

(56) References Cited

U.S. PATENT DOCUMENTS

| | | | |
|---|---|---|---|
| 6,348,279 B1* | 2/2002 | Saito | H01M 8/0204 |
| | | | 429/492 |
| 2002/0058177 A1* | 5/2002 | Nishiyama | H01M 8/0247 |
| | | | 429/434 |
| 2005/0008909 A1* | 1/2005 | Kaye | B01J 8/0214 |
| | | | 429/423 |
| 2006/0115709 A1* | 6/2006 | Badding | H01M 8/0273 |
| | | | 429/457 |
| 2006/0204824 A1 | 9/2006 | Mazza et al. | |
| 2009/0081522 A1* | 3/2009 | Washima | H01M 8/0206 |
| | | | 429/518 |
| 2009/0086025 A1* | 4/2009 | Ngu | C01B 3/32 |
| | | | 348/159 |
| 2010/0015483 A1* | 1/2010 | Yang | H01M 8/04007 |
| | | | 429/413 |
| 2012/0058411 A1* | 3/2012 | Kobayashi | H01M 8/2465 |
| | | | 429/465 |

OTHER PUBLICATIONS

Concise Explanation of Relevance of Can Kreuz: "PEM—Brennstoffzellen mit spritzgegossenen Bipolarplatten aus hochgefÖlltem Graphit-Compound", Dissertation, Fakultat fOr Ingenieurwissenschaften, Abteilung Maschinenbau der Universitat DuisburgEssen, 2008.

Machine Translation of CN1846324.
Machine Translation of CN101438447.

\* cited by examiner

FUEL CELL STACK SEALING METHODS, APPARATUS, AND SYSTEMS

TECHNICAL FIELD

This disclosure relates to fuel cell stacks for vehicles. For example, in some embodiments and implementations, this disclosure relates to methods, apparatus, and systems for improving and/or simplifying one or more seals between various plates/units of a vehicle fuel cell stack.

BACKGROUND

Fuel cell systems produce electrical energy through the oxidation and reduction of a fuel and an oxidant. Hydrogen, for example, may be used to produce electricity efficiently in a fuel cell. Vehicles powered by hydrogen fuel cells are often more efficient and generate fewer emissions than vehicles employing internal combustion engines.

In a typical fuel cell system, hydrogen or a hydrogen-rich gas is supplied as a reactant through a flowpath to an anode side of a fuel cell and oxygen is supplied as a reactant through a separate flowpath to a cathode side of the fuel cell. Catalysts, often in the form of a noble metal, such as platinum, are typically placed at the anode and cathode to facilitate the electrochemical conversion of the reactants into electrons and positively charged ions (for the hydrogen) and negatively charged ions (for the oxygen). In some fuel cells, the anode and cathode may be made from a layer of electrically-conductive gas diffusion media (GDM) with the catalysts deposited thereon to form a catalyst coated diffusion media (CCDM). An electrolyte layer (also called an ionomer layer) may be used to separate the anode from the cathode to allow for the selective passage of ions from the anode to the cathode while simultaneously prohibiting the passage of the generated electrons Such electrons are forced to flow through an external electrically-conductive circuit (such as a load) to perform useful work before recombining with the charged ions at the cathode. The combination of the positively and negatively charged ions at the cathode results in the production of water as a by-product of the reaction. In another typical fuel cell, the anode and cathode may be formed directly on the electrolyte layer to form a layered structure known as a membrane electrode assembly (MEA).

Proton exchange membrane (PEM) fuel cells have shown particular promise for use in vehicles. The electrolyte layer of a PEM fuel cell is a solid proton-transmissive membrane, such as a perfluorosulfonic acid membrane (PFSA). Regardless of whether the above MEA-based approach or CCDM-based approach is employed, the presence of an anode separated from a cathode by an electrolyte layer forms a single PEM fuel cell. A plurality of such cells can be combined together to form a fuel cell stack in order to increase the power output.

The individual cells of fuel cell stacks are typically compressed together under high forces, both to ensure that proper electrical contact is made to enable drawing current from the stack and to create seals between various headers and/or conduits within the stack used to deliver the reactants and coolants through the stack. Insulating plates are often used in such stacks in order to electrically insulate one or more of the cells and/or current collecting elements from other components of the stack, such as from an end unit assembly or frame plate. Insulating plates have typically been formed from a plastic material and the adjacent end unit/frame plates have typically been formed from aluminum castings, forgings, or stampings.

Such designs may sometimes be less than ideal due to unbalanced forces on opposite sides of the insulating plate, which may result in flexing of the plate and/or a seal that may lack a desired seal compression and therefore be prone to leakage and/or failure. In order to ensure that the headers/conduits maintain a proper seal, some fuel stacks have been manufactured by bolting or otherwise fastening the plastic insulating plate to an adjacent aluminum end/frame plate with mechanical fasteners. Such designs remain less than ideal in that, for example, they often require many fasteners and other parts, they may still be configured with an undesirable interdependence between load balancing of adjacent seals, and they may still fail to adequately prevent flexing and/or offloading of seals between the insulating plate and the adjacent end/frame plate.

The present inventor has therefore determined that it would be desirable to provide methods, apparatus, and systems for improving and/or simplifying one or more seals between various plates/units of a vehicle fuel cell stack that overcome one or more of the foregoing limitations and/or other limitations of prior art.

SUMMARY

Methods, apparatus, and systems are disclosed herein for improving and/or simplifying one or more seals between various plates/units of a vehicle fuel cell stack. In some embodiments and implementations, such improvements may be accomplished by overmolding a seal, such as a grommet seal, to an end frame plate of a fuel cell stack. In some such embodiments and implementations, the seal may be molded separately and installed in the fuel cell stack. In some such embodiments and implementations, the end frame plate may comprise an extruded piece comprising a plurality of hollow cavities. Such cavities may be filled with a cavity-filler material, which may comprise a foam material, which may facilitate the overmolding process. In some embodiments and implementations, the entire insulating plate may be overmolded onto the frame plate and may, as an integral unit, comprise a plurality of grommet-like seals, which may comprise headers, extending between opposite surfaces of the frame plate.

In one more particular example of a method according to an implementation of the invention for manufacturing a fuel cell stack plate, a plate may be extruded through an extrusion die so as to create a plate comprising a top surface, a bottom surface, and a plurality of cavities disposed between the top and bottom surfaces. At least a subset of the cavities may be filled with a cavity-filler material distinct from a material used to form the plate, such as a foam material. In some implementations, all of the cavities may be filled with this material. One or more headers may then be overmolded into the plate to form corresponding conduits between the top surface and the bottom surface of the plate.

In some implementations, overmolding the headers into the plate may comprise overmolding one or more grommets into the plate. In some implementations, overmolding the headers into the plate may comprise overmolding an insulating plate onto the plate, wherein the insulating plate comprises the one or more headers. The overmolded insulating plate may comprise a plurality of headers, wherein each header defines a conduit between the top surface of the plate and the bottom surface of the plate.

In another example of a method according to the inventive principles disclosed herein, the method may comprise a method for manufacturing a fuel cell stack. The method may comprise forming a frame plate and overmolding an insulating plate onto the frame plate so as to form a plurality of headers extending between a top surface of the frame plate and a bottom surface of the frame plate. In some implementations, each of the plurality of headers may overlap with at least a portion of the top surface of the frame plate and at least a portion of the bottom surface of the frame plate. An end plate may then be positioned adjacent to the frame plate.

In some implementations, the insulating plate may be overmolded onto the frame plate so as to form an integral piece comprising the frame plate and each of the plurality of headers. The insulating plate may also, or alternatively, be overmolded onto the frame plate so as to create a sealing flange adjacent to a surface of the frame plate opposite from the insulating plate. The sealing flange may extend around a plurality (in some cases all) of the headers. Alternatively, separate sealing flanges may be formed around each of the headers, or a subset of the headers.

In some implementations, the step of forming a frame plate may comprise extruding the frame plate through an extrusion die so as to create a frame plate comprising a top surface, a bottom surface, and a plurality of cavities disposed between the top and bottom surfaces, and then filling the cavities with a foam material or another cavity-filler material.

In one particular example of an embodiment of a fuel cell stack, the fuel cell stack may comprise a plurality of electrochemical fuel cells with an insulating plate positioned adjacent to at least one of the plurality of electrochemical fuel cells. The stack may further comprise an end plate and a frame plate positioned between the insulating plate and the end plate. The frame plate may comprise a top surface, a bottom surface, and one or more headers defining a conduit between the top surface and the bottom surface. The header(s) may comprise a grommet configured to create a first seal with the end plate and a second seal with the insulating plate. In some embodiments, the grommet(s) may overlap with the frame plate on the top surface and on the bottom surface.

In some embodiments, the fuel cell stack may lack any mechanical fasteners between the insulating plate and the frame plate. This may be useful for certain applications/embodiments because such fasteners often tend to result in imbalanced seal loads, which may result in deflecting of the insulating plate. The frame plate may comprise a plurality of cavities formed between the top surface and the bottom surface and, as discussed above, in some embodiments, the cavities may be filled with a foam material or another similar cavity-filler material. In some such embodiments, the frame plate may comprise an extruded plate rather than a casting piece.

One or more of the grommets may comprise two distinct seal profiles on opposing ends of the grommet and/or may be configured to transfer a seal force from the end plate to the insulating plate. In some embodiments, the frame plate may comprise a plurality of headers, and the grommet may comprise an integral grommet defining at least two of the plurality of headers. In some embodiments, the grommet(s) may comprise an overmolded grommet.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
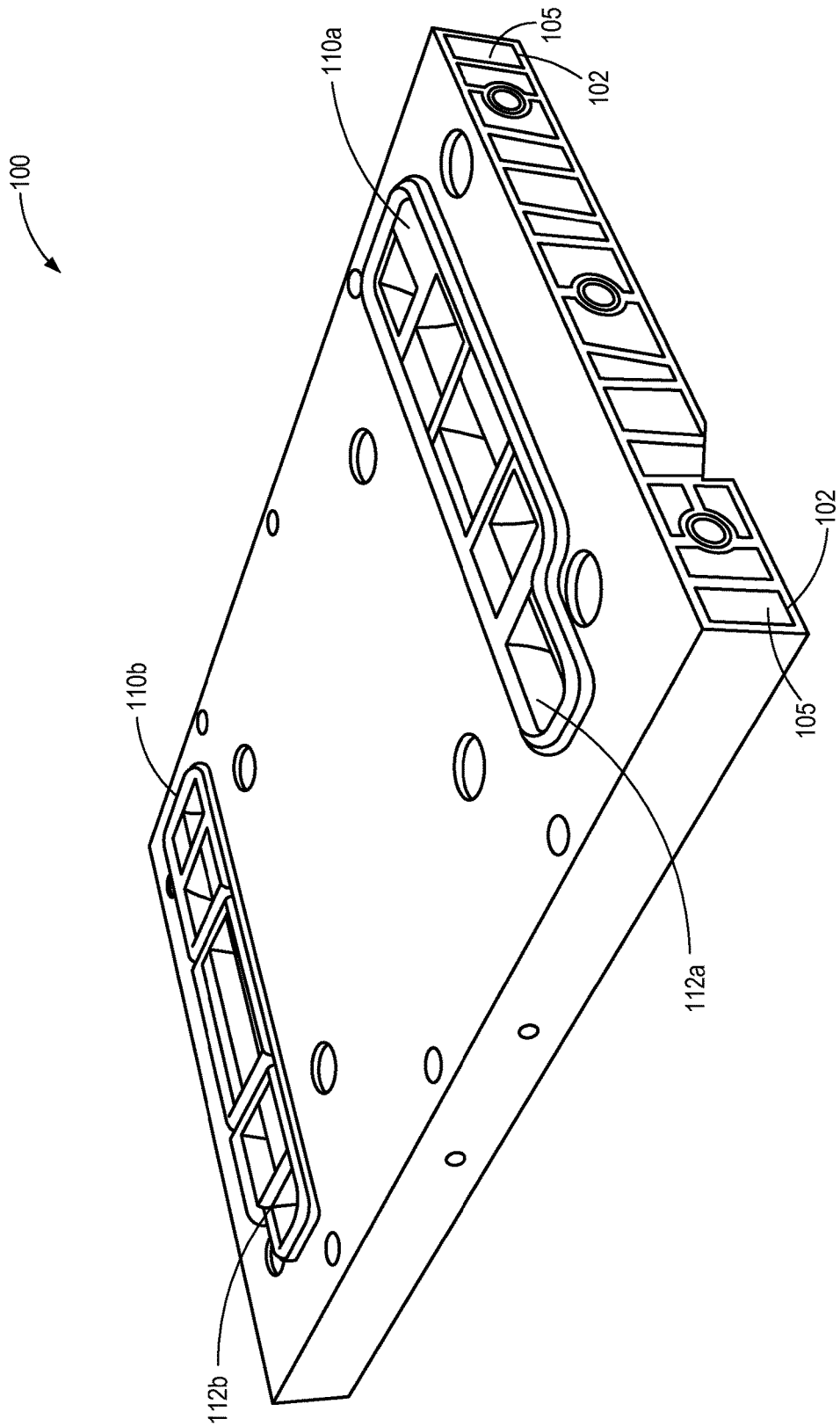
FIG. 1 is a perspective view of an embodiment of a plate for a fuel cell stack comprising overmolded, grommet-style headers.

A detailed description of apparatus, systems, and methods consistent with various embodiments of the present disclosure is provided below. While several embodiments are described, it should be understood that disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein may be used to improve and/or simplify one or more seals within a vehicle fuel cell stack for delivery of reactants and/or coolants throughout the stack. In some embodiments and implementations, such improvements may be accomplished by overmolding a seal, such as a grommet seal, to an end frame plate of a fuel cell stack. In some such embodiments and implementations, the end frame plate may comprise an extruded piece comprising a plurality of hollow cavities. Such cavities may be filled with a cavity-filler material, which may comprise a foam material, which may facilitate the overmolding process. In some embodiments and implementations, the foam material may comprise a structural foam configured to improve overall frame rigidity.

In other implementations and embodiments, other materials may be used as the cavity-filler material, such as foamed concrete, plastic materials, and the like. Preferably, the cavity-filler material is less dense than aluminum, and preferably the cavity-filler material is selected so as to withstand the temperatures and pressures associated with the molding processes described herein.

In some embodiments and implementations, the entire insulating plate may be overmolded onto the frame plate and may, as an integral unit, comprise a plurality of grommet-like seals, which may comprise headers, extending between opposite surfaces of the frame plate. In such embodiments and implementations, the insulating plate and its accompanying seals may comprise an elastomeric material.

One or more of the embodiments and/or implementations discussed herein may provide certain benefits, such as eliminating issues associated with angled headers normally used to connect the stack with an end unit. Some embodiments and implementations may also, or alternatively, provide benefits in the way of a reduced number of parts/components in a fuel cell stack assembly. Some embodiments and implementations may also, or alternatively, allow for the use of two distinct seal profiles, one of which may be used to couple an insulating plate header to a frame unit header and the other of which may be used to couple the frame unit header to an end unit header. Some embodiments and implementations may also, or alternatively, be configured to transfer the seal load(s) to the frame unit rather than to the insulating plate as with many current stacks, which may help prevent or at least ameliorate the flexing and seal offloading problems previously mentioned. Some embodiments and implementations may also, or alternatively, prevent the need for coupling the insulating plate to the frame with mechanical fasteners in order to prevent flexing and/or deflection of the insulating plate and/or seal unloading during low stack compression (cold and dry).

Additional details of certain embodiments and implementations will now be discussed in greater detail in connection with the accompanying figures. FIG. 1 depicts a perspective view of an embodiment of a plate 100 for a fuel cell stack comprising overmolded, grommet-style headers. Plate 100 comprises an extruded plate that may be formed by an extrusion process. Thus, plate 100 may comprise any of a variety of suitable materials, such as, for example, aluminum. Plate 100 has also been manufactured with a plurality of internal cavities 102 that may be formed during the extrusion process. In the depicted embodiment, each of the cavities 102 has been filled with a filler material 105 that may be used to facilitate an overmolding process. In some embodiments, filler material 105 may comprise a foam material, such as a structural foam configured to improve overall frame rigidity.

In other implementations and embodiments, filler material 105 may comprise other suitable materials, such as foamed concrete, plastic materials, and the like. Preferably, filler material 105 is less dense than aluminum, and filler material 105 is selected so as to withstand the temperatures and pressures associated with the molding processes described herein.

Plate 100 may comprise a frame plate configured to be positioned adjacent to an insulating plate (not shown) and an end unit/plate on the opposite side. Plate 100 also comprises two overmolded assemblies, 110a and 110b, both comprising a plurality of headers 112a and 112b, respectively, that are configured to create seals with headers and/or conduits in an adjacent piece of a fuel cell stack. In the depicted embodiment, both of the overmolded assemblies 110a/110b comprise five headers 112a/112b. However, it should be understood that alternative embodiments are contemplated in which a single assembly may comprise all of the headers in the plate. Similarly, other embodiments are contemplated in which each header is formed separately within plate 100. And, of course, other numbers of headers may be used as desired.

Figure 2:
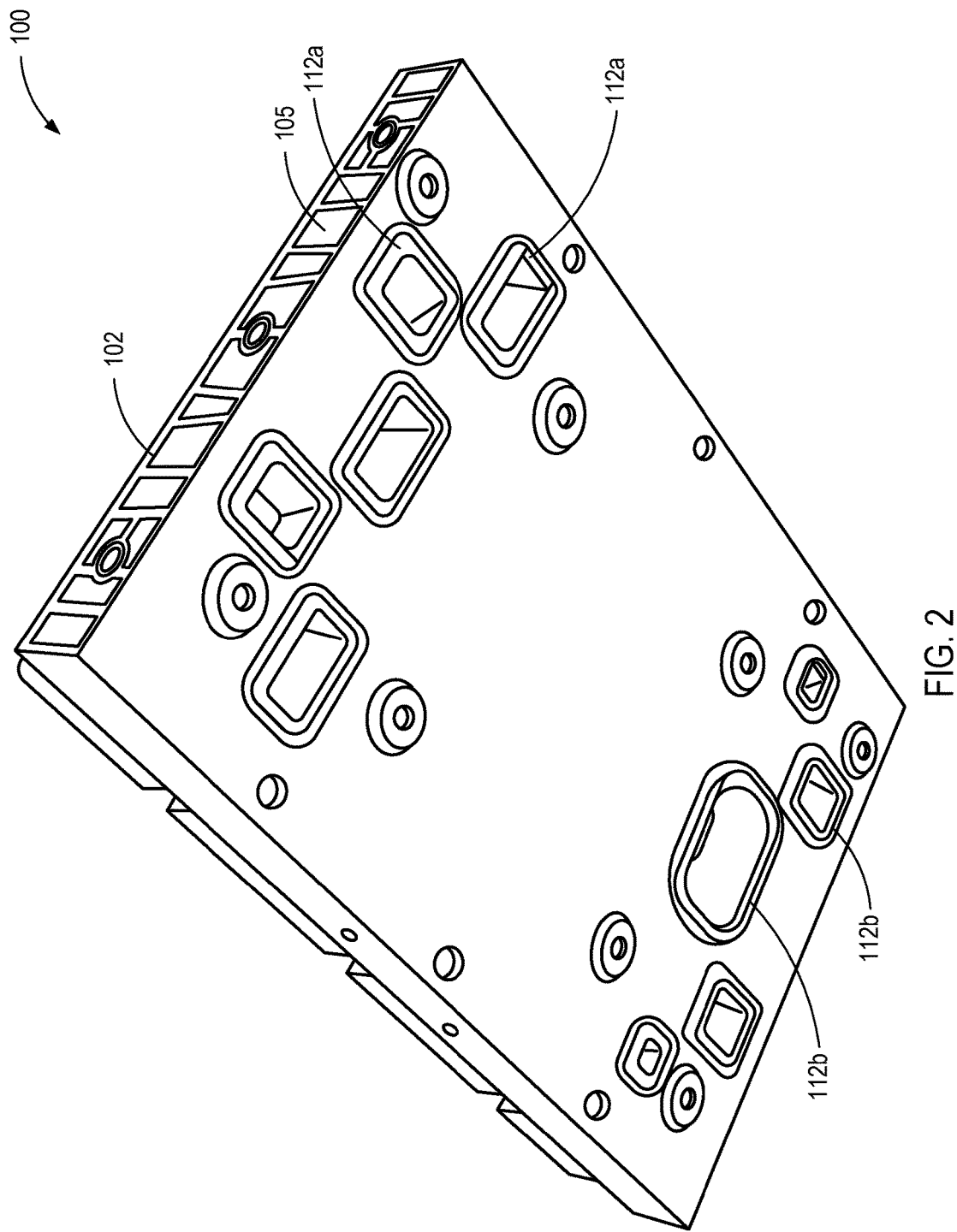
FIG. 2 is a perspective view of a side of the plate of FIG. 1 opposite from the side depicted in FIG. 1.

FIG. 2 is a perspective view of a bottom side of plate 100 opposite from the top side depicted in FIG. 1. As shown in this figure, each of the headers 112a of overmolded assembly 110a is separate on the bottom side of plate 100 from each of the adjacent headers 112a of overmolded assembly 110a. Similarly, each of the headers 112b of overmolded assembly 110b is separate on the bottom side of plate 100 from each of the adjacent headers 112b of overmolded assembly 110b.

However, again, a variety of alternative embodiments are contemplated. For example, in some embodiments, the side of plate 100 depicted in FIG. 2 may be similar or identical to the side depicted in FIG. 1. In other words, overmolded assembly 110a may comprise an integral piece configured such that each of the various headers 112a is integrally coupled with one another on both sides of plate 100. Similarly, overmolded assembly 110b may instead comprise an integral piece configured such that each of the various headers 112b is integrally coupled with one another on both sides of plate 100. Alternatively, as mentioned above, in other embodiments each header may be entirely separate from one another on both sides of plate 100 or each header may be integrally coupled with every other header formed within plate 100.

Figure 3:
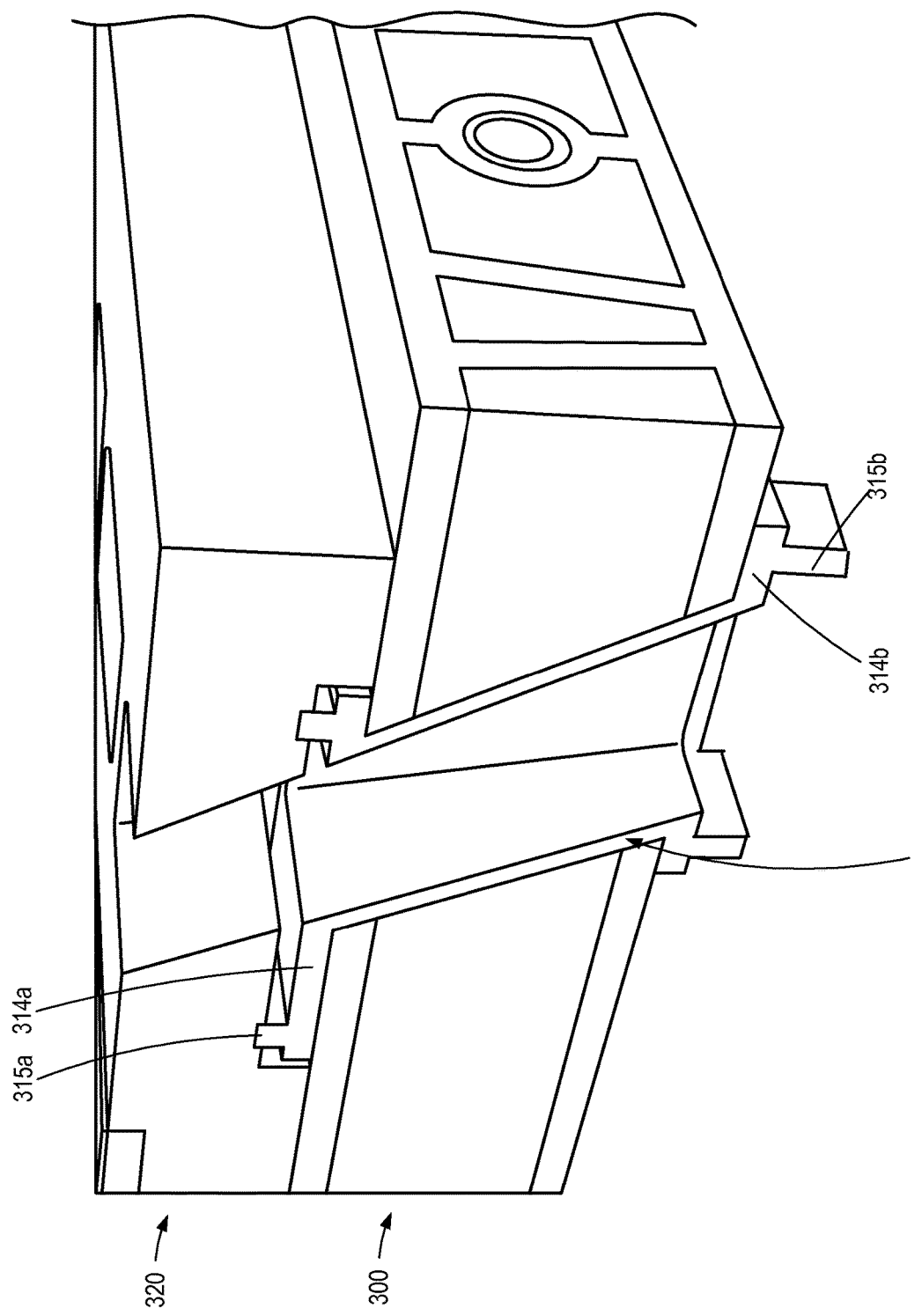
FIG. 3 is a cross-sectional view depicting an embodiment of a plate for a fuel cell stack along with an adjacent insulating plate and a grommet-style seal.

FIG. 3 is a cross-sectional view depicting an alternative embodiment of a frame plate 300 for a fuel cell stack, along with an adjacent insulating plate 320 of the stack. As shown in this figure, plate 300 comprises an overmolded header 310. Header 310 comprises a grommet configured to create a seal with an end plate (not shown in FIG. 3) and another seal with an adjacent insulating plate 320. Also, as can be seen in the figure, grommet 310 overlaps with plate 300 on both a first surface and on a second surface opposite from the first surface, which may create desirable loading characteristics that may prevent seal leakage and/or undesirable flexing of the insulating plate 320.

More particularly, grommet 310 comprises a first sealing flange 314a positioned adjacent to an upper surface of plate 300 and a second sealing flange 314b positioned adjacent to a lower surface of plate 300. This configuration may be used to create a desirable distribution of forces when a load is applied to the fuel cell stack. More particularly, grommet 310 is configured to transfer a seal force from an end plate/unit to insulating plate 320. It can also be seen in FIG. 3 that grommet 310 extends between adjacent surfaces of plate 300 at a non-perpendicular angle, which may provide stability during the overmolding process.

Grommet 310 also comprises sealing lips 315a/315b that may extend from both sealing flanges 314a/314b to further assist in establishing desirable seals with adjacent headers/conduits. Grommet 310 also comprises a first seal profile on a first end of the grommet and a second seal profile on a second end of the grommet. More particularly, lower sealing lip(s) 315b is longer than upper sealing lip(s) 315a to accommodate the greater variation in compression due to dimensional variation in the parts providing compression.

Although in certain preferred embodiments, as previously discussed, headers/seals may be overmolded onto an extruded plate, other embodiments are contemplated in which grommet-style headers/seals may be inserted into machined openings in other types of plates, such as castings rather than extruded pieces. Such headers may be formed from rubber or another flexible material so as to allow for flexing such headers/seals into place.

Figure 4:
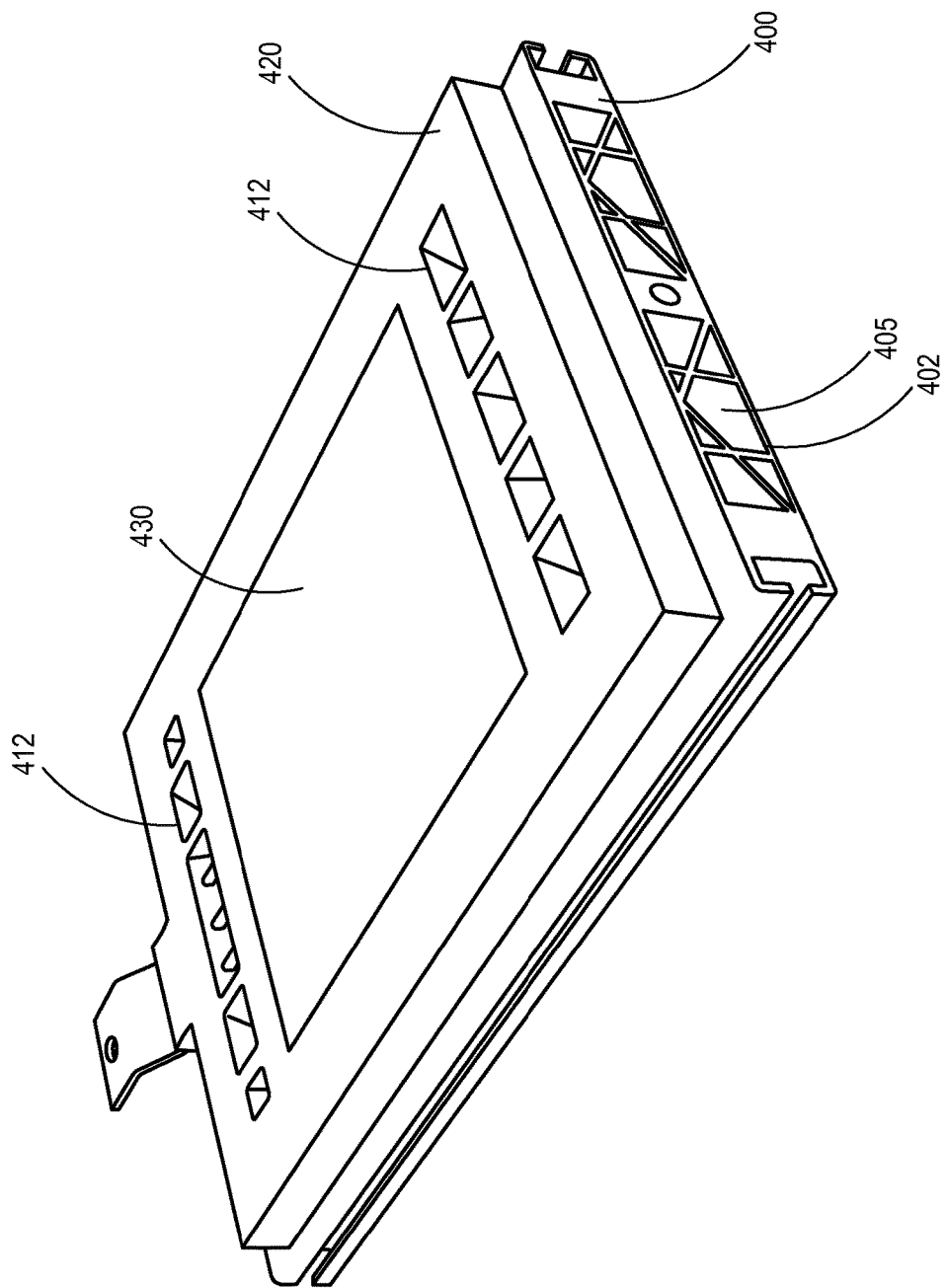
FIG. 4 is a perspective view of an alternative embodiment of a plate for a fuel cell stack comprising an adjacent overmolded insulating plate.

FIG. 4 is a perspective view of an alternative embodiment of a plate 400 for a fuel cell stack comprising an overmolded insulating plate 420. The embodiment depicted in FIG. 4 differs from that of FIG. 3 in that the entire insulating plate 420 is overmolded onto plate 400. Moreover, insulating plate 420 comprises integrally-formed headers 412 that extend through adjacent plate 400. A current collector plate 430 may be embedded within or otherwise positioned adjacent to plate 420.

Similar to other embodiments referenced above, plate 400 may comprise an extruded plate comprising a plurality of cavities 402 formed during the extrusion process. Also, a filler material 405, such as foam, may be positioned within cavities 402 to facilitate overmolding insulating plate 420 and the accompanying headers 412 to plate 400.

Figure 5:
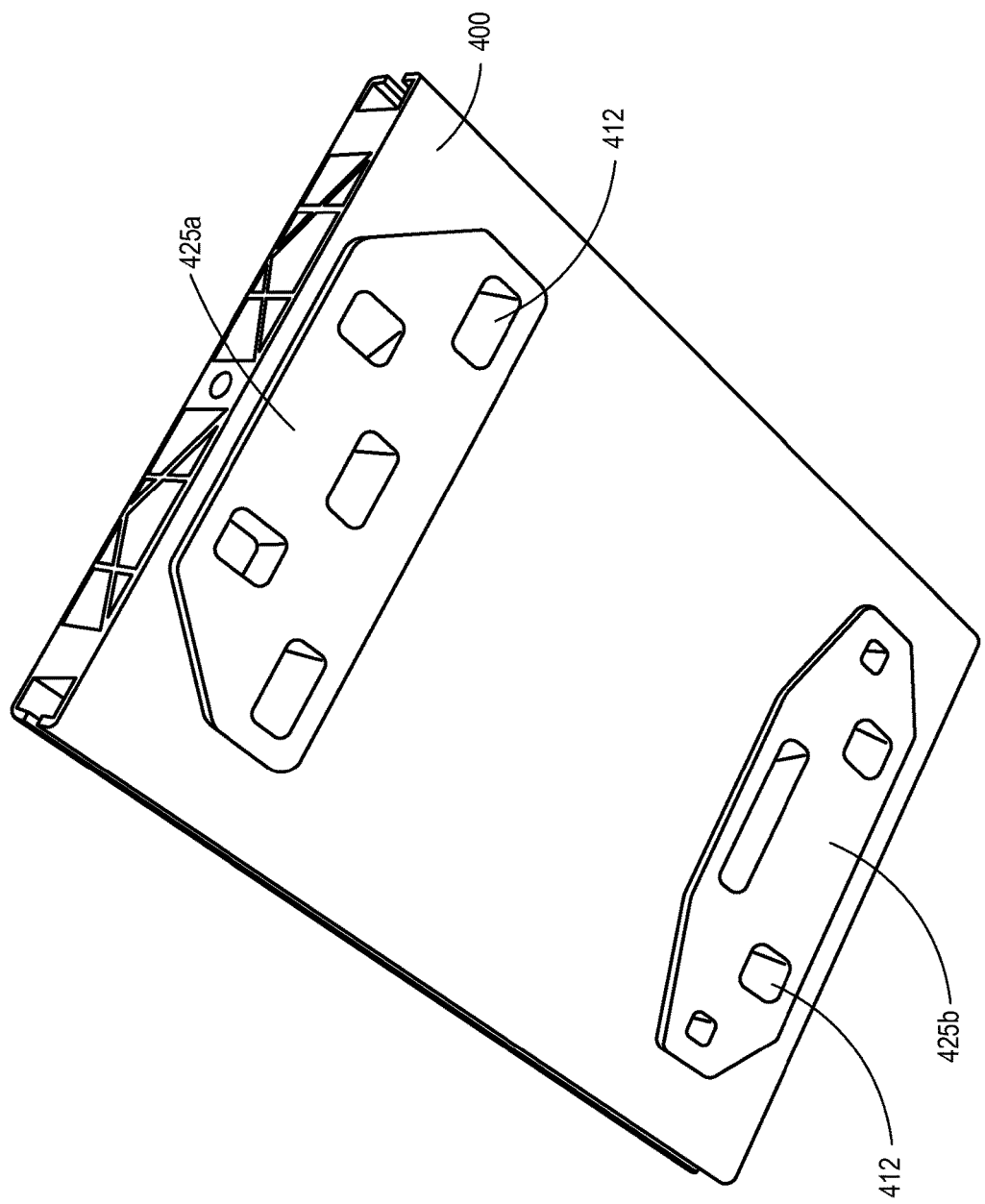
FIG. 5 is a perspective view of a side of the plate of FIG. 4 opposite from the side depicted in FIG. 4

FIG. 5 is a perspective view of plate 400 shown from the opposite side. As shown in this figure, insulating plate 420 comprises sealing flanges 425a and 425b, each of which is integrally coupled with a plurality of headers 412 that extend through plate 400 and are integrally coupled with the portion of insulating plate 420 depicted in FIG. 4.

Many of the alternatives posed above may also be applied to the embodiment depicted in FIGS. 4 and 5. For example, alternative embodiments are contemplated in which a single sealing flange may extend across the entire lower surface, or at least across the entire portion of the lower surface comprising header openings, of plate 400. As another example, in other embodiments, the portion of insulating plate 420 positioned on the upper surface of plate 400 may, like the opposite portion of insulating plate 420, be broken up into multiple portions.

Figure 6:
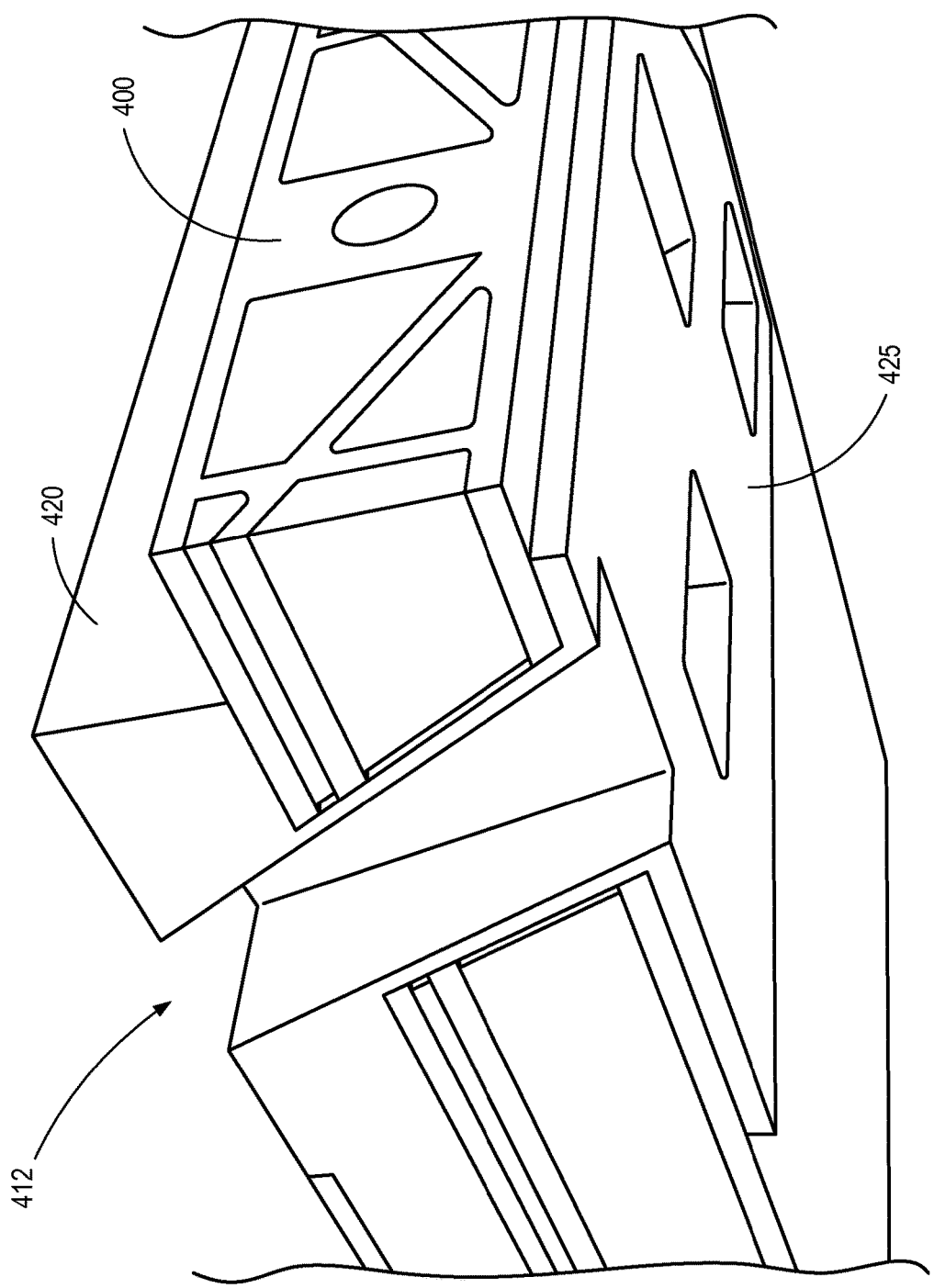
FIG. 6 is a cross-sectional view of the embodiment of FIGS. 4 and 5.

FIG. 6 is a cross-sectional view of the embodiment depicted in FIGS. 4 and 5. As better shown in this figure, insulating plate 420 comprises an overmolded integral piece comprising a plurality of headers 412 extending through plate 400 and a sealing flange 425 positioned around a plurality of headers adjacent to an opposite surface of plate 400. As still another example of an alternative embodiment, a separate sealing flange may be formed around each header rather than forming an integral plate extending around a plurality of headers if desired.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for manufacturing a fuel cell stack plate for a fuel cell system operable to produce electricity, the method comprising:
   extruding a plate material through an extrusion die so as to create a plate having a top surface, a bottom surface opposite the top surface, a plurality of cavities disposed between the top and bottom surfaces, and a plurality of apertures each extending through the top and bottom surfaces;
   filling at least a subset of the cavities with a cavity filler material distinct from the plate material used to form the plate, wherein the cavity filler material comprises a structural foam material, foamed concrete material, and/or a plastic filler material; and
   overmolding at least one header into the plate and through at least one of the cavities and the cavity filler material within the at least a subset of the cavities, wherein the at least one header contacts and forms a conduit between the top surface and the bottom surface, and wherein the conduit comprises an open conduit configured for delivering at least one of reactants and coolants through the fuel cell stack plate.

2. The method of claim 1, wherein the cavity filler material comprises the structural foam material, the structural foam material being configured to increase overall rigidity of the plate.

3. The method of claim 1, wherein the filling at least the subset of the cavities with the cavity filler material comprises filling all of the cavities with the cavity filler material.

4. The method of claim 1, wherein the overmolding at least one header into the plate comprises overmolding at least one grommet into the plate.

5. The method of claim 1, wherein the overmolding at least one header into the plate comprises overmolding an insulating plate onto the plate, wherein the insulating plate is integrally formed with the at least one header.

6. The method of claim 5, wherein the insulating plate includes a plurality of headers, wherein each of the headers defines a respective conduit between the top surface of the plate and the bottom surface of the plate.

7. A method for manufacturing a fuel cell stack, the method comprising:
   forming a frame plate having a top surface, a bottom surface opposite the top surface, a plurality of cavities disposed between the top and bottom surfaces, and a plurality of apertures each extending through the top and bottom surfaces;
   overmolding an insulating plate onto the frame plate, the insulating plate being integrally formed with a plurality of integral headers extending between the top surface and the bottom surface of the frame plate so as to form an integral single-piece structure comprising the insulating plate and the plurality of headers, and wherein each of the plurality of headers extends through at least one of the cavities and overlaps with at least a portion of the top surface of the frame plate and at least a portion of the bottom surface of the frame plate; and
   positioning an end plate adjacent to the frame plate.

8. The method of claim 7, wherein each of the headers of the insulating plate includes a respective sealing flange adjacent to the bottom surface of the frame plate opposite from the insulating plate.

9. The method of claim 8, wherein at least one of the sealing flanges extends around a plurality of the headers.

10. The method of claim 7, wherein the forming the frame plate comprises:
    extruding a plate material through an extrusion die so as to create the frame plate comprising the top surface, the bottom surface, and the plurality of cavities disposed between the top and bottom surfaces; and
    filling the cavities with a foam material.

11. A method for manufacturing a frame plate for a fuel cell system, the fuel cell system including a stack of electrochemical fuel cells, an insulating plate adjacent one of the electrochemical fuel cells, and an end plate adjacent the insulating plate, the method comprising:
    forming a frame plate from a plate material such that the frame plate is configured to position between the insulating and end plates, the frame plate having an elongated body with opposing longitudinal faces, opposing lateral faces, opposing first and second rectangular faces connecting the longitudinal and lateral faces, multiple cavities extending longitudinally between and through the longitudinal faces, and multiple apertures extending laterally between and through the rectangular faces;
    after forming the frame plate, adding a cavity filler material into the plurality of cavities, the cavity filler material including a foam material distinct from the plate material of the frame plate; and
    after adding the cavity filler material, molding a single-piece header assembly formed from a plastic material, distinct from the plate and foam materials, onto the frame plate, the header assembly including a first seal flange adjacent the first rectangular face, a second seal flange adjacent the second rectangular face, and a first conduit integrally formed with and extending between the first and second seal flanges, the first conduit extending through a first one of the apertures and the cavity filler material.

12. The method of claim 11, wherein the first seal flange is seated against the first rectangular face, and the second seal flange is seated against the second rectangular face.

13. The method of claim 11, wherein the first conduit extends between the first and second seal flanges at a non-perpendicular angle.

14. The method of claim 11, wherein the header assembly further includes a first sealing lip projecting from the first seal flange, and a second sealing lip projecting from the second seal flange.

15. The method of claim 14, wherein the second sealing lip is longer than the first sealing lip.

16. The method of claim 14, wherein the first seal flange has a first seal profile and the second seal flange has a second seal profile distinct from the first seal profile.

17. The method of claim 11, wherein the single-piece header assembly further includes a third seal flange adjacent the first rectangular face, a fourth seal flange adjacent the second rectangular face, and a second conduit integrally formed with and extending between the third and fourth seal flanges, the second conduit extending through a second one of the apertures and the cavity filler material.

18. The method of claim 11, further comprising molding a second single-piece header assembly onto the frame plate, the second header assembly including a third seal flange adjacent the first rectangular face, a fourth seal flange adjacent the second rectangular face, and a second conduit integrally formed with and extending between the third and fourth seal flanges, the second conduit extending through a second one of the apertures and the cavity filler material.

19. The method of claim 11, wherein the plastic material of the single-piece header assembly includes a flexible rubber material.

* * * * *